United States Patent
Matsui

(10) Patent No.: US 12,120,770 B2
(45) Date of Patent: Oct. 15, 2024

(54) COMMUNICATION APPARATUS CAPABLE OF COMMUNICATING WITH OTHER DEVICES, CONTROL METHOD OF COMMUNICATION APPARATUS, AND STORAGE MEDIUM

(71) Applicant: CANON KABUSHIKI KAISHA, Tokyo (JP)

(72) Inventor: Takashi Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 17/699,926

(22) Filed: Mar. 21, 2022

(65) Prior Publication Data
US 2022/0312179 A1 Sep. 29, 2022

(30) Foreign Application Priority Data
Mar. 26, 2021 (JP) .................................. 2021-053819

(51) Int. Cl.
*H04W 8/00* (2009.01)
*H04W 4/02* (2018.01)
*H04W 16/28* (2009.01)

(52) U.S. Cl.
CPC ........... *H04W 8/005* (2013.01); *H04W 4/026* (2013.01); *H04W 16/28* (2013.01)

(58) Field of Classification Search
None
See application file for complete search history.

(56) References Cited

U.S. PATENT DOCUMENTS

2016/0373181 A1* 12/2016 Black .................... H04W 16/28
2021/0055109 A1* 2/2021 Teng ...................... G01C 21/12

FOREIGN PATENT DOCUMENTS

JP 2011049857 A 3/2011

* cited by examiner

*Primary Examiner* — Christine T Duong
(74) *Attorney, Agent, or Firm* — Canon U.S.A., Inc., IP Division

(57) ABSTRACT

A communication apparatus includes a first transmission unit configured to transmit a first signal for a search in a predetermined first range, a second transmission unit configured to transmit a second signal for a search in a second range narrower than the predetermined first range, a communication unit configured to wirelessly communicate with an external apparatus, a control unit configured to, upon receipt of a first response to the first signal transmitted by the first transmission unit, control the second transmission unit to transmit the second signal for the search in the second range narrower than the predetermined first range, based on a direction of the first response, and an informing unit configured to, upon receipt of a second response to the second signal transmitted by the second transmission unit, inform a user of a direction of the external apparatus.

10 Claims, 3 Drawing Sheets

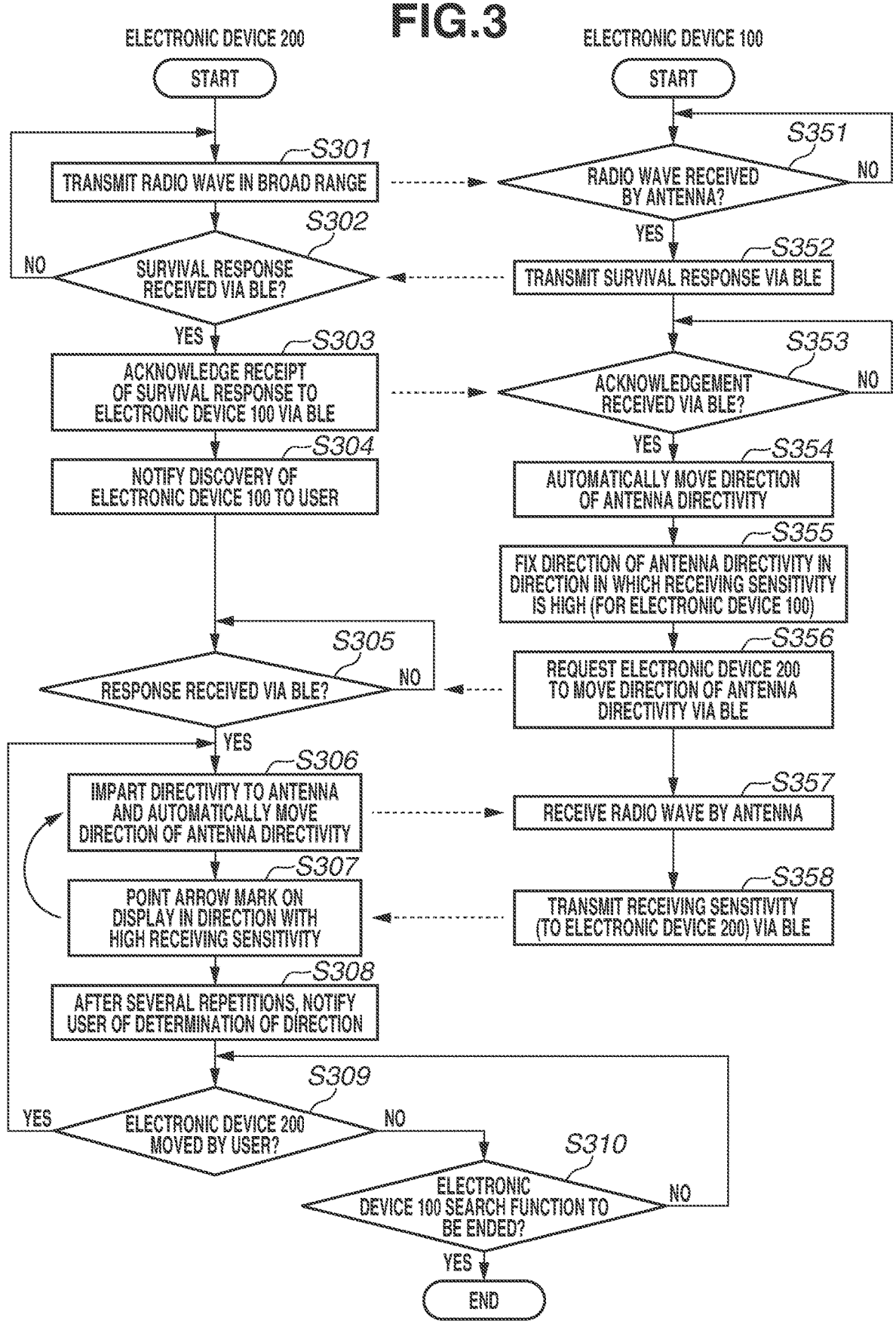

COMMUNICATION APPARATUS CAPABLE OF COMMUNICATING WITH OTHER DEVICES, CONTROL METHOD OF COMMUNICATION APPARATUS, AND STORAGE MEDIUM

BACKGROUND

Field

The present disclosure relates to a communication apparatus that can wirelessly communicate with external apparatuses.

Description of the Related Art

In recent years, there has been an increasing number of mobile digital devices with a wireless communication function that can be used by a user to communicate with other devices. For example, Japanese Patent Application Laid-Open No. 2011-049857 discusses a digital camera with a wireless communication function.

Such mobile digital devices with a wireless communication function require no wired connection when the devices are used, and thus there is an issue that the devices can be relatively easy to lose.

SUMMARY

According to various embodiments of the present disclosure, a communication apparatus is provided that includes a first transmission unit configured to transmit a first signal for a search in a predetermined first range, a second transmission unit configured to transmit a second signal for a search in a second range narrower than the predetermined first range, a communication unit configured to wirelessly communicate with an external apparatus, a control unit configured to, upon receipt of a first response to the first signal transmitted by the first transmission unit, control the second transmission unit to transmit the second signal for the search in the second range narrower than the predetermined first range, based on a direction of the first response, and an informing unit configured to, upon receipt of a second response to the second signal transmitted by the second transmission unit, inform a user of a direction of the external apparatus.

Further features of the present disclosure will become apparent from the following description of example embodiments with reference to the attached drawings.

BRIEF DESCRIPTION OF THE DRAWINGS

FIG. 3 is a flowchart illustrating a procedure for controlling the electronic devices in which one device is searched for by converting a radio wave from the other device into electronic power according to the first example embodiment.

DESCRIPTION OF THE EMBODIMENTS

Hereinafter, example embodiments for carrying out various embodiments of the present disclosure will be described in detail with reference to the accompanying drawings.

The example embodiments described below are examples of implementation means of the present disclosure, and may be corrected or modified as appropriate depending on the configuration and various conditions of an apparatus to which embodiments of the present disclosure are applied. In addition, the example embodiments may be combined as appropriate.

Figure 1:
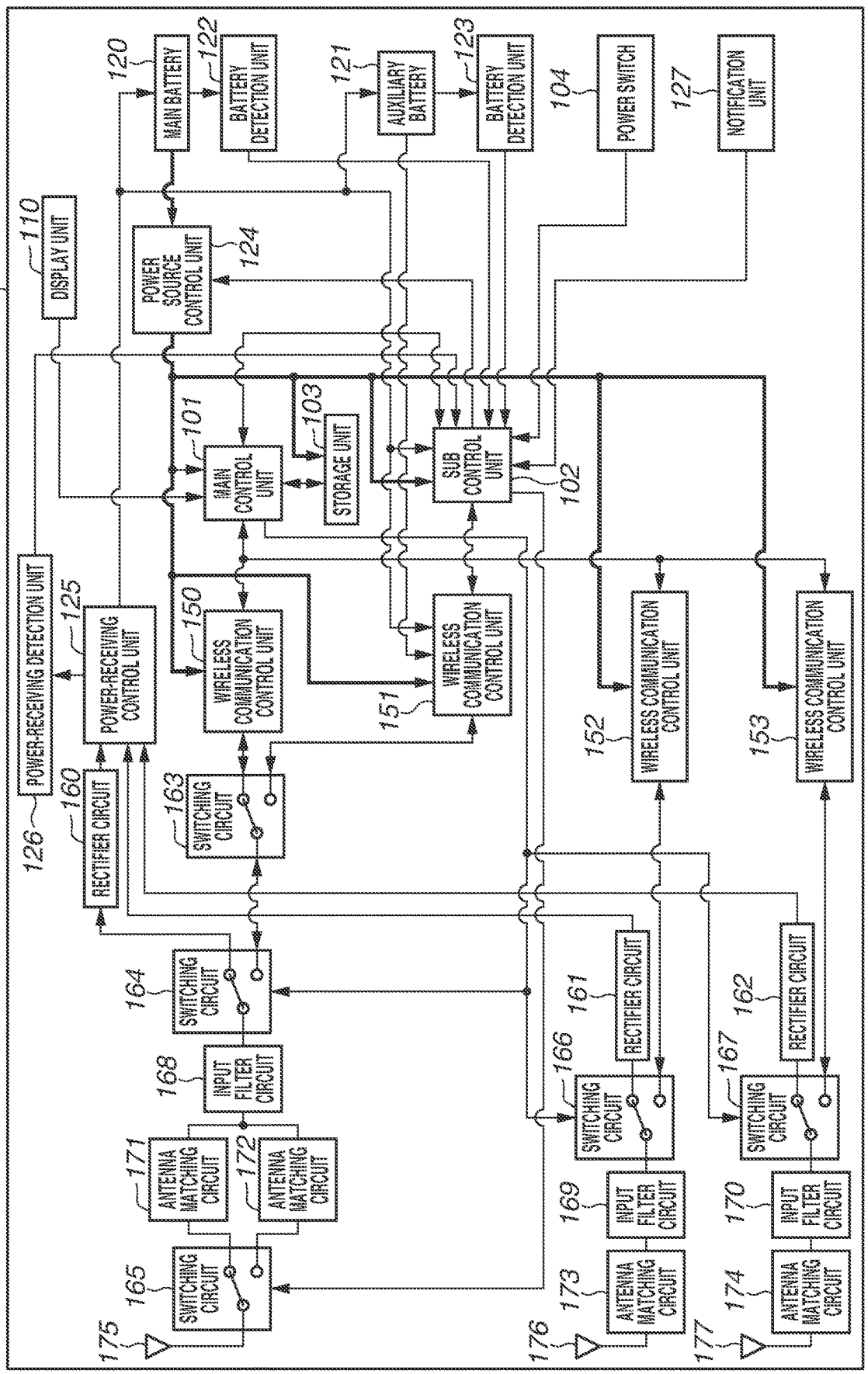
FIG. 1 is a schematic block diagram illustrating a hardware configuration example of an electronic device according to a first example embodiment.
Figure 2:
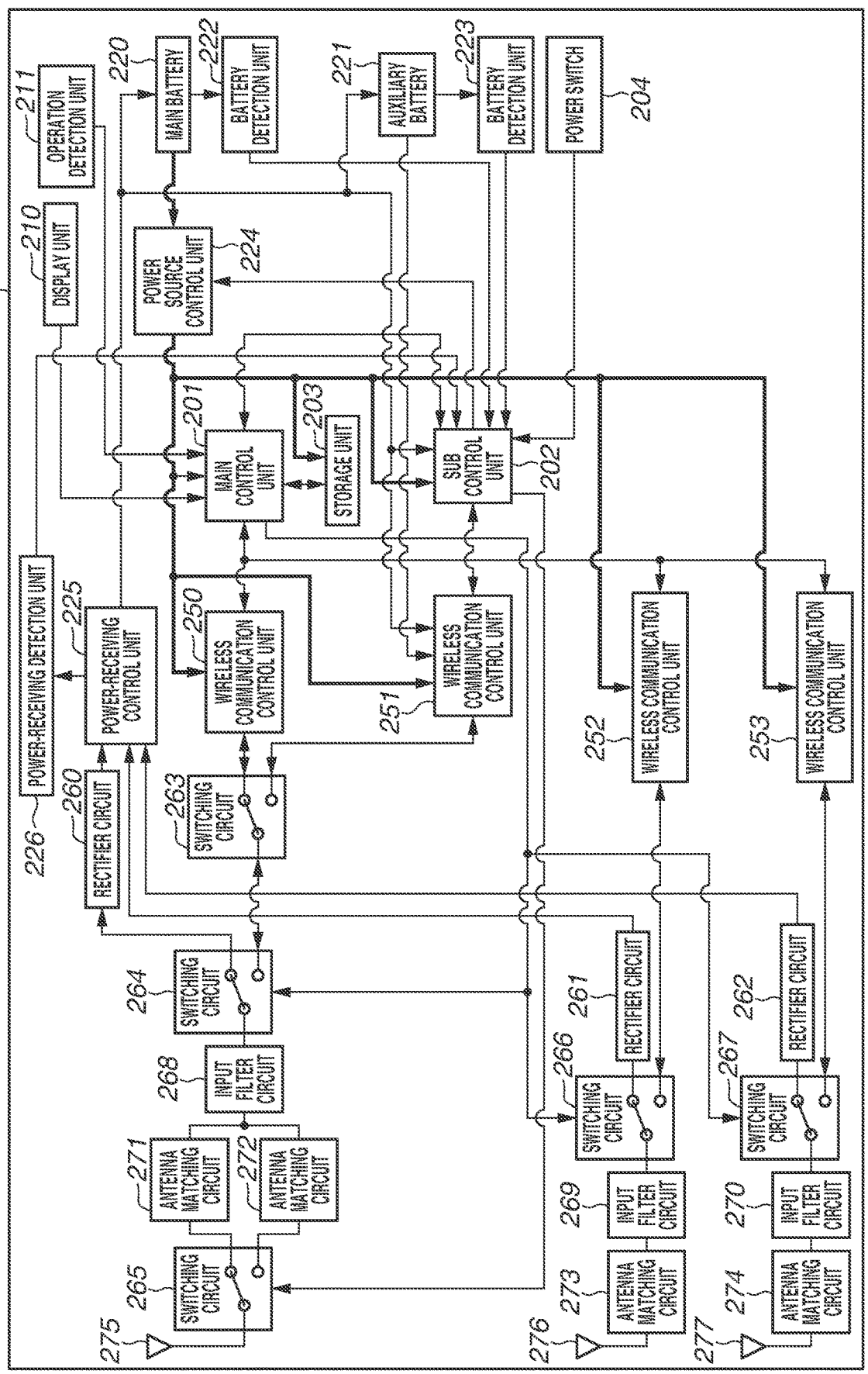
FIG. 2 is a schematic block diagram illustrating a hardware configuration example of an electronic device according to the first example embodiment.

Referring to FIGS. 1 and 2, electronic devices 100 and 200 run on electric batteries; the electronic devices 100 and 200 may take the form of mobile devices such as a camera and a smartphone, for example. In the present example embodiment, one of the electronic devices 100 and 200 is carried by a user and the other thereof is a device to be searched for. Main control units 101 and 201 of the respective devices control the electronic devices 100 and 200, respectively.

Sub control units 102 and 202 of the respective electronic devices can also control the electronic devices 100 and 200, respectively. The sub control units 102 and 202 run with lower power consumption than the power consumption required for the main control units 101 and 201, respectively. Storage units 103 and 203 of the respective devices can store settings and the like even without power supply, and can communicate with the main control units 101 and 201, respectively. Power switches 104 and 204 of the respective devices are operated by the user to power on and off the electronic devices 100 and 200, respectively.

Main batteries 120 and 220 of the respective devices are secondary batteries typified by rechargeable lithium-ion batteries and serve as main power sources to operate the electronic devices 100 and 200, respectively. Auxiliary batteries 121 and 221 of the respective devices are coin batteries or the like that also serve as power sources to operate the electronic devices 100 and 200, respectively. The auxiliary batteries 121 and 221 have smaller capacities than those of the main batteries 120 and 220 and play the role of auxiliary power supplies in the absence of the main power sources.

The auxiliary batteries 121 and 221 are rechargeable secondary batteries. Battery detection units 122 and 222 detect the presence or absence of the main batteries 120 and 220, respectively, and the remaining battery levels thereof. Battery detection units 123 and 223 detect the presence or absence of the auxiliary batteries 121 and 221 and the remaining battery levels thereof. Power source control units 124 and 224 respectively control the power sources of the electronic devices 100 and 200, and receive electric power from the main batteries 120 and 220 and the like and supply the electric power to the main control units 101 and 201, the sub control units 102 and 202, the storage units 103 and 203, and the like.

A notification unit 127 provides a notification to the user visually such as by a light-emitting diode (LED) or aurally such as by a buzzer. Power-receiving control units 125 and 225 control electric power from microwaves and the like. Power-receiving detection units 126 and 226 detect amounts of power received by the power-receiving control units 125 and 225. Wireless communication control units 150 and 250 wirelessly transmit and receive data by wireless local area network (LAN) or the like using radio waves in a 2.4-gigahertz (GHz) band. Wireless communication control units 151 and 251 can wirelessly transmit and receive data with only a power supply from the auxiliary batteries 121 and 221 with smaller capacities and lower power consumption than those of the wireless communication control units 150 and 250.

The wireless communication control units 151 and 251 wirelessly transmit and receive data by, for example, Bluetooth® or Bluetooth Low Energy® (hereinafter, abbreviated as BLE) using radio waves in the 2.4-GHz band. Wireless communication control units 152 and 252 wirelessly transmit and receive data using radio waves in a frequency band different from that of the wireless communication control units 150 and 250 for communication. For example, the wireless communication control units 152 and 252 use radio waves in a 5-GHz band. Wireless communication control units 153 and 253 wirelessly transmit and receive data using radio waves in a frequency band different from those of the wireless communication control units 150 and 250 and the wireless communication control units 152 and 252 for communication. For example, the wireless communication control units 153 and 253 are fifth-generation communication systems using radio waves in a 28-GHz band.

Rectifier circuits 160 and 260 rectify communication radio waves in the frequency band used for data communication by the wireless communication control units 150 and 250 and supply electric power to the power-receiving control units 125 and 225, respectively. Rectifier circuits 161 and 261 rectify communication radio waves in the frequency band used for data communication by the wireless communication control units 152 and 252 and supply electric power to the power-receiving control units 125 and 225, respectively. Rectifier circuits 162 and 262 rectify communication radio waves in the frequency band used for data communication by the wireless communication control units 153 and 253 and supply electric power to the power-receiving control units 125 and 225, respectively.

Switching circuits 163 and 263 switch between the wireless communication control units 150 and 250 and the wireless communication control units 151 and 251, respectively, using the identical frequency band. Switching circuits 164 and 264 switch between wireless data communication by either the wireless communication control units 150 and 250 or the wireless communication control units 151 and 251, respectively, and power supply to the power-receiving control units 125 and 225 via the rectifier circuits 160 and 260, respectively, with wireless communication radio waves as electric power. Switching circuits 165 and 265 switch between antenna matching circuits 171 and 271 and antenna matching circuits 172 and 272, respectively. Switching circuits 166 and 266 switch between wireless data communication by the wireless communication control units 152 and 252, respectively, and power supply to the power-receiving control units 125 and 225 via the rectifier circuits 161 and 261, respectively, with wireless communication radio waves as electric power. Switching circuits 167 and 267 switch between wireless data communication by the wireless communication control units 153 and 253, respectively, and power supply to the power-receiving control units 125 and 225 via the rectifier circuits 162 and 262, respectively, with wireless communication radio waves as electric power.

Input filter circuits 168 and 268 allow passage of radio waves in the frequency band used for data communication by the wireless communication control units 150 and 250 or the wireless communication control units 151 and 251, respectively. Input filter circuits 169 and 269 allow passage of radio waves in the frequency band used for data communication by the wireless communication control units 152 and 252, respectively. Input filter circuits 170 and 270 allow passage of radio waves in the frequency band used for data communication by the wireless communication control units 153 and 253, respectively.

The antenna matching circuits 171 and 271 respectively cause impedances of antennas 175 and 275 to match at the used frequency. The antenna matching circuits 172 and 272 respectively cause the impedances of the antennas 175 and 275 to match at the used frequency that is different from the frequency of the antenna matching circuits 171 and 271 in the same communication frequency band as that of the antenna matching circuits 171 and 271. Antenna matching circuits 173 and 273 respectively cause impedances of antennas 176 and 276 to match at the used frequency.

Antenna matching circuits 174 and 274 respectively cause impedances of antennas 177 and 277 to match at the used frequency. The antennas 175 and 275 receive radio waves in the frequency bands used by the wireless communication control units 150 and 250 and the wireless communication control units 151 and 251, respectively. The antennas 176 and 276 receive radio waves in the frequency bands used by the wireless communication control units 152 and 252, respectively. The antennas 177 and 277 receive radio waves in the frequency bands used by the wireless communication control units 153 and 253, respectively. The antennas 175 to 177 and 275 to 277 may be imparted directivity. Display units 110 and 210 can display images and various kinds of information for the user. An operation detection unit 211 using a direction sensor or a global positioning system (GPS) detects whether the electronic device 200 has moved.

Hereinafter, a control operation for searching for a device by receiving a radio wave from another device and converting the radio wave into electric power according to a first example embodiment will be described with reference to FIG. 3.

FIG. 3 is an example of a procedure for controlling the electronic device 100 and the electronic device 200 in which one device is searched for by receiving a radio wave from another device and converting the radio wave into electric power.

Processing in the control procedure of FIG. 3 is started when the electronic device 100 and the electronic device 200 are paired in advance and a function such as a search mode, for example, is enabled in the electronic device 200. In the present example embodiment, BLE is used as an example, but another wireless standard may be used as long as the electronic devices 100 and 200 can grasp each other's device information by pairing or the like. Unless otherwise specified, the processing by the electronic device 100 illustrated in FIG. 3 is implemented by the main control unit 101 controlling the entire electronic device 100 in cooperation with other components. The processing by the electronic device 200 illustrated in FIG. 3 is implemented by the main control unit 201 controlling the entire electronic device 200 in cooperation with other components.

In step S301, the electronic device 200 transmits a non-directional radio wave to the outside for a search in a predetermined broad range. At this time, although it is desirable that the electronic device 200 use either of the antennas 276 and 277 other than the antenna 275 used for BLE communication, the electronic device 200 may use the antenna 275. The radio wave transmitted is desirably a radio wave that can be converted into large electric power by the electronic device 100. In the present example embodiment, the wireless communication control unit 252 is used as an example. In step S351, the wireless communication control unit 152 receives the radio wave transmitted in step S301, and the above-described rectifier circuit 161 converts the received radio wave into electric power and stores the electric power in the main battery 120. In the present example embodiment, basically, the main battery 120 is used to charge and discharge electric power. However, the main battery 120 may not be attached if the auxiliary battery 121 is used or the received electric power can be directly used.

In step S352, the wireless communication control unit 150 transmits an advertising communication indicating a survival response to the electronic device 200. At this time, in order to obtain a larger amount of radio wave from the electronic device 200, the wireless communication control unit 150 desirably instructs the electronic device 200 to continuously transmit dummy data or specifies the type of radio wave to be converted into electric power. In that case, the main control unit 101 and the sub control unit 102 may be set to instruct the electronic device 200 to continuously transmit dummy data upon receipt of a radio wave from the antenna 176 before the main battery 120 of the electronic device 100 becomes exhausted. This allows the electronic device 100 to make a response to a search request upon receipt of a radio wave even if the main battery 120 becomes exhausted.

Upon receipt of the survival response in step S302, the electronic device 200 desirably makes a notification on the display unit 210 or the like to caution the user not to move the electronic device 200 in consideration of the subsequent steps in the procedure. In step S303, the wireless communication control unit 250 acknowledges receipt of the survival response to the electronic device 100. Upon receipt of an acknowledgement from the electronic device 200 in step S353, in step S354, the electronic device 100 imparts directivity to the antenna 176 and moves the direction of the antenna directivity to several directions. In step S355, the electronic device 100 fixes the direction of the antenna directivity to a direction in which the receiving sensitivity is high, and the processing proceeds to step S356. In step S356, the electronic device 100 now transmits a request to the electronic device 200 for moving the direction of directivity of the antenna 276. If no response (request) is received in step S305 (NO in step S305), the electronic device 200 waits for the response (request) (repeats step S305). The user may possibly leave the device without receiving the response (request) in step S305. In this case, the processing may return to step S301 after a lapse of a predetermined time. Upon receipt of the response (request) from the electronic device 100 in step S305, in step S306, the electronic device 200 imparts directivity to the antenna 276 and moves the direction of the antenna directivity. In parallel, the electronic device 200 desirably notifies the user of the current direction of the antenna directivity by displaying an arrow mark on the display unit 210 of the electronic device 200 so that the user can easily recognize.

In step S357, the electronic device 100 receives the radio wave by the antenna 176. In step S358, the electronic device 100 transmits information on receiving sensitivity and the like to the electronic device 200. In step S307, the electronic device 200 points the arrow mark on the display unit 210 in the direction in which the receiving sensitivity is high. The arrow mark may be displayed after the direction in which the receiving sensitivity is high becomes known to some extent. Upon receipt of the receiving sensitivity, the receiving sensitivity to the current direction of the antenna directivity becomes known. Thus, in step S306, after moving the antenna directivity in a certain direction, the antenna directivity needs to be held until the receiving sensitivity becomes known. A series of steps S306 to S307 is repeated several times, and when the direction is determined to some extent, the electronic device 200 determines that the electronic device 100 has been discovered. In step S308, the electronic device 200 notifies the user of the determination on the display unit 210 or the like. If the notification is also to be made by the notification unit 127 of the electronic device 100, the timing for the notification is not limited to the above-described timing. For example, the notification may be made continuously from an earlier timing or may be made stepwise. The arrow mark on the electronic device 200 may be increased in size or emphasized with improvement in the receiving sensitivity. This allows the user to more easily recognize and discover the electronic device 100. The electronic device 200 may display a graphical user interface (GUI) to notify the user of a status by distinguishing between a state in which the electronic device 100 is being searched for in a broad range in step S301 and a state in which the electronic device 100 is being searched for in a specific direction in step S306.

The user may be able to discover the electronic device 100 in this manner, but may move the electronic device 200 during the search for the electronic device 100. Thus, in step S309, if a direction sensor or a position sensor detects that the electronic device 200 has been moved, the processing proceeds to step S306 to return to the series of steps in the procedure. After returning to step S306 as above, if no signal is received from the electronic device 100 in step S307, the processing returns to step S301 as in the case where no response is received for a predetermined time in step S305. In step S310, the search function is ended by the user who has terminated the search for the electronic device 100, and the procedure ends.

As above, in the first example embodiment, it is possible to search for a target device even if the target device runs out of battery, by converting a radio wave from another device into electric power.

The electronic device 100 may include a unit for measuring power-receiving efficiency and transmit measurement results of the power-receiving efficiency to the electronic device 200. The electronic device 200 displays a change in the power-receiving efficiency and, if the user approaches the electronic device 100 and the power-receiving efficiency increases, the electronic device 100 notifies the electronic device 200 of an increase in the power-receiving efficiency so that the electronic device 100 can be more easily discovered.

In the above description, non-directional communication is carried out in step S301 as an example. Alternatively, in S301, the antenna 176 may be imparted directivity and the direction of the directivity of the antenna 176 may be moved in several directions. In this case, the direction is moved in a broader range than a range in which the direction of the antenna directivity is moved in step S306. For example, in step S301, the direction of directivity of the antenna in the electronic device 200 is moved in a range of about 90 degrees to the right and to the left of the horizontal center, whereas in step S306, the direction of directivity of the antenna in the electronic device 200 is moved in a range of about 15 degrees to the right and to the left of the horizontal center.

Various embodiments of the present disclosure can be realized by executing processing as follows: supplying software (programs) for implementing the functions of the above-described example embodiment to a system or an apparatus via a network or various storage media, and reading and executing program codes by a computer (or a central processing unit (CPU) or a micro processing unit (MPU)) in the system or the apparatus. In this case, the programs and the storage media storing the programs constitute the present disclosure.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-053819, filed Mar. 26, 2021, which is hereby incorporated by reference herein in its entirety.

What is claimed is:

1. A communication apparatus comprising:
at least one processor or circuit configured to function as:
a first transmission unit configured to transmit a first signal for a search in a predetermined first range;
a second transmission unit configured to transmit a second signal for a search in a second range narrower than the predetermined first range;
a communication unit configured to wirelessly communicate with an external apparatus;
a control unit configured to, upon receipt of a first response to the first signal transmitted by the first transmission unit, control the second transmission unit to transmit the second signal for the search in the second range narrower than the predetermined first range, based on a direction of the first response; and
an informing unit configured to, upon receipt of a second response to the second signal transmitted by the second transmission unit, inform a user of a direction of the external apparatus,
wherein in a case where communication is performed by the second transmission unit, the communication apparatus continuously communicates dummy data for the external apparatus.

2. The communication apparatus according to claim 1, wherein the first transmission unit and the second transmission unit are separate but identical directional antennas.

3. The communication apparatus according to claim 1, wherein the first transmission unit is a non-directional antenna and the second transmission unit is a directional antenna.

4. The communication apparatus according to claim 1, wherein, upon receipt of a response to a signal with higher directivity than directivity of a previously received response, the informing unit determines that the external apparatus has been discovered and indicates a location of the external apparatus.

5. The communication apparatus according to claim 1,
wherein the external apparatus includes a measurement unit configured to measure efficiency of power receiving, and
wherein information displayed by the informing unit is changed based on a result of measurement by the measurement unit.

6. The communication apparatus according to claim 1, wherein the external apparatus responds to the first signal transmitted by the first transmission unit using electric power obtained by receiving the first signal.

7. The communication apparatus according to claim 1, wherein the external apparatus includes a battery, and the external apparatus is set to, upon receipt of the first signal from the first transmission unit, instruct, before the battery becomes exhausted, the communication unit of the communication apparatus to continuously transmit dummy data to the external apparatus.

8. The communication apparatus according to claim 5, wherein the external apparatus includes a notification unit, and the external apparatus provides a notification by the notification unit based on the result of the measurement by the measurement unit.

9. A control method of a communication apparatus, the method comprising:
transmitting a first signal for a search in a predetermined first range;
after transmitting the first signal for a search in the predetermined first range, transmitting a second signal for a search in a second range narrower than the predetermined first range;
wirelessly communicating with an external apparatus;
upon receipt of a first response to the first signal, controlling the communication apparatus to transmit the second signal for the search in the second range narrower than the predetermined first range, based on a direction of the first response; and
upon receipt of a second response to the second signal, informing a user of a direction of the external apparatus,
wherein, in a case where communication is performed, the communication apparatus continuously communicates dummy data for the external apparatus.

10. A non-transitory computer-readable storage medium storing a program for causing a computer to function as the units of the communication apparatus according to claim 1.

* * * * *